(12) United States Patent
Eastcott

(10) Patent No.: US 6,877,942 B2
(45) Date of Patent: Apr. 12, 2005

(54) RAMP TRAILER FOR OIL FIELD TUBULARS

(75) Inventor: Garnet B. Eastcott, Red Deer (CA)

(73) Assignee: Circle T Service & Rental Ltd., Alberta (CA)

(*) Notice: Subject to any disclaimer, the term of this patent is extended or adjusted under 35 U.S.C. 154(b) by 80 days.

(21) Appl. No.: 10/279,453

(22) Filed: Oct. 23, 2002

(65) Prior Publication Data
US 2003/0123955 A1 Jul. 3, 2003

Related U.S. Application Data

(63) Continuation-in-part of application No. 09/551,934, filed on Apr. 19, 2000, now abandoned.

(30) Foreign Application Priority Data
Apr. 18, 2000 (CA) .............................. 2306061

(51) Int. Cl.$^7$ ............................................. E21B 19/00
(52) U.S. Cl. ................. 414/22.54; 414/22.57; 414/22.58; 414/22.59; 414/22.61; 414/22.62
(58) Field of Search ........................... 414/22.57–22.62, 414/22.54; 175/85; 298/17.5, 17.8, 12

(56) References Cited

U.S. PATENT DOCUMENTS

| | | | |
|---|---|---|---|
| 4,382,632 A | 5/1983 | Pitts | 298/17 S |
| 4,684,314 A * | 8/1987 | Luth | 414/746.1 |
| 4,842,470 A | 6/1989 | Hubbard | 414/478 |
| 5,248,005 A | 9/1993 | Mochizuki | 175/85 |
| 6,079,925 A | 6/2000 | Morgan et al. | 414/22.57 |
| 6,179,065 B1 | 1/2001 | Payne et al. | 175/24 |
| 6,227,311 B1 | 5/2001 | Osadchuck | 175/53 |

* cited by examiner

Primary Examiner—Donald P. Walsh
Assistant Examiner—Jeffrey A. Shapiro
(74) Attorney, Agent, or Firm—Sheridan Ross PC

(57) ABSTRACT

The trailer is operative to carry tubulars (drill collars or drill pipe) to a service rig and raise them to the level of the rig floor so that the rig elevators can latch onto them and stand them up in the derrick. The trailer has a roller-equipped carriage operative to move along tracks supported by and extending lengthwise of the trailer frame. An elongate flat bed is pivotally mounted at its front end to the trailer frame. The bed's rear end can be raised by a scissor hoist connected between the carriage and the rear end of the bed. The bed has grooves extending lengthwise thereof in which the tubulars sit. Thus the trailer can be backed up to within a few feet from the well. The rear end of the bed can be raised and the carriage and bed can be advanced rearwardly to bring the rear ends of the tubulars within reach of the rig elevators.

5 Claims, 11 Drawing Sheets

RAMP TRAILER FOR OIL FIELD TUBULARS

CROSS REFERENCE TO RELATED APPLICATION

The present application is a continuation-in-part of U.S. patent application Ser. No. 09/551,934, filed Apr. 19, 2000 now abandoned, of the same title, which is incorporated herein by this reference.

FIELD OF THE INVENTION

The present invention relates to apparatus for positioning drilling tubulars (drill collars or drill pipe) at the edge of the floor of a service rig within reach of the rig elevators, so that the elevators can be used to raise the tubulars into a vertical position in the derrick.

BACKGROUND OF THE INVENTION

Historically, service rigs have not been normally used in a drilling mode. They are not designed or equipped for that purpose. However in recent years, with the development of top drives, there has been increasing use of service rigs to deepen wells, drill out cement plugs and drill out bridge plugs. This has meant that the service rig has had to run drill collars and drill pipe to carry out these new drilling operations.

In this connection, difficulties have been encountered in picking up and laying down the drilling tubulars.

For example, in the specific case of drill collars (which are heavy, thick-walled joints of steel pipe), they are typically trucked from a storage yard to the well site and are deposited on timbers laid on the ground. The service rig usually does not have a catwalk and inclined ramp. Therefore, to stand the drill collar up in the service rig derrick, it is necessary for the crew to attach a winch line from the crown of the derrick to the front end of the collar and attempt to manually control the rear end of the collar as the line pulls the front end of the collar up and toward the rig floor, while seeking to avoid having the front end snag the edge of the hinged floor. This operation from time to time leads to damaging the floor or collar threads when the collar snags the floor or alternatively hurting members of the crew as they try to muscle the heavy collar into the proper position. Similar problems occur when the service rig lays down drill collars.

With this background in mind, it is the objective of the present invention to provide apparatus which can be used to bring drilling tubulars to the well site, position the front ends of the tubulars at the edge of the service rig's elevated floor, within reach of the elevators, and provide an inclined ramp along which the rear end of the tubular being stood up can be dragged up to floor level.

SUMMARY OF THE INVENTION

In accordance with the present invention, a wheeled vehicle, preferably a trailer, is provided having the following components:
- a horizontal frame supporting track means, preferably a pair of parallel, laterally spaced-apart tracks, extending lengthwise of the trailer;
- a horizontal carriage having front and rear wheels supported by the track, said carriage being operative to roll along the tracks;
- means, such as a double-acting hydraulic cylinder, connected between the frame and the carriage, for advancing and retracting the carriage along the tracks;
- an elongate bed, pivotally connected to the front end of the carriage at the bed's front end, with the bed's rear end left free to be raised; and
- means, such as a hydraulic cylinder-powered scissor hoist, connected between the carriage and bed, for raising the rear end of the bed;
- the bed preferably having means, such as a top wall forming a series of parallel grooves extending lengthwise of the bed, for supporting, restraining (from lateral movement) and guiding tubulars positioned thereon;
- whereby the tubulars may be conveyed on the trailer-mounted bed to the well site, the trailer may be positioned with its rear end positioned close to but spaced laterally from the wellhead (so as not to impede access to the blow-out preventer), the rear end of the bed may be raised and the carriage and bed may be advanced rearwardly to bring the rear ends of the tubulars to a position adjacent the edge of the rig floor, where they may be latched onto by the rig elevators.

Preferably, a cradle for holding a top drive is supported by the frame at its rear end. The cradle preferably can turn about a vertical axis. A top drive is seated on the cradle. A winch assembly is supported by the frame, forwardly of the cradle. The cradle and top drive can therefore be accurately aligned with the rig and the cable of the winch assembly can be used to restrain and control the top drive as the rig's winch cable lifts and carries it up into the rig derrick. Similarly, the cable of the winch assembly can be used to pull the top drive from the rig and to the cradle.

In addition, the trailer frame preferably supports a hydraulic motor assembly for supplying pressurized fluid through hoses to the cylinders and the top drive to operate them.

The invention is characterized by the following advantages:
- the time required to stand a set of six collars up in the derrick can be reduced by as much as 50% as compared to the prior art manual/winch line system previously described;
- the rig crew do not need to as extensively manually adjust and control the collars as they are being picked up or laid down, with consequent reduction in the likelihood of injury;
- the bed can bring the drill collars (with attached pick-up subs) to the edge of the service rig floor, where the rig elevators can be latched onto them so that the rig hoisting equipment can be used to stand the collars up; and
- the trailer carries a top drive and a hydraulic motor assembly, whereby drilling tubulars and rotary drive means (the top drive) may be brought in one package to supply the service rig with drilling capability.

DESCRIPTION OF THE PREFERRED EMBODIMENT

Figure 1:
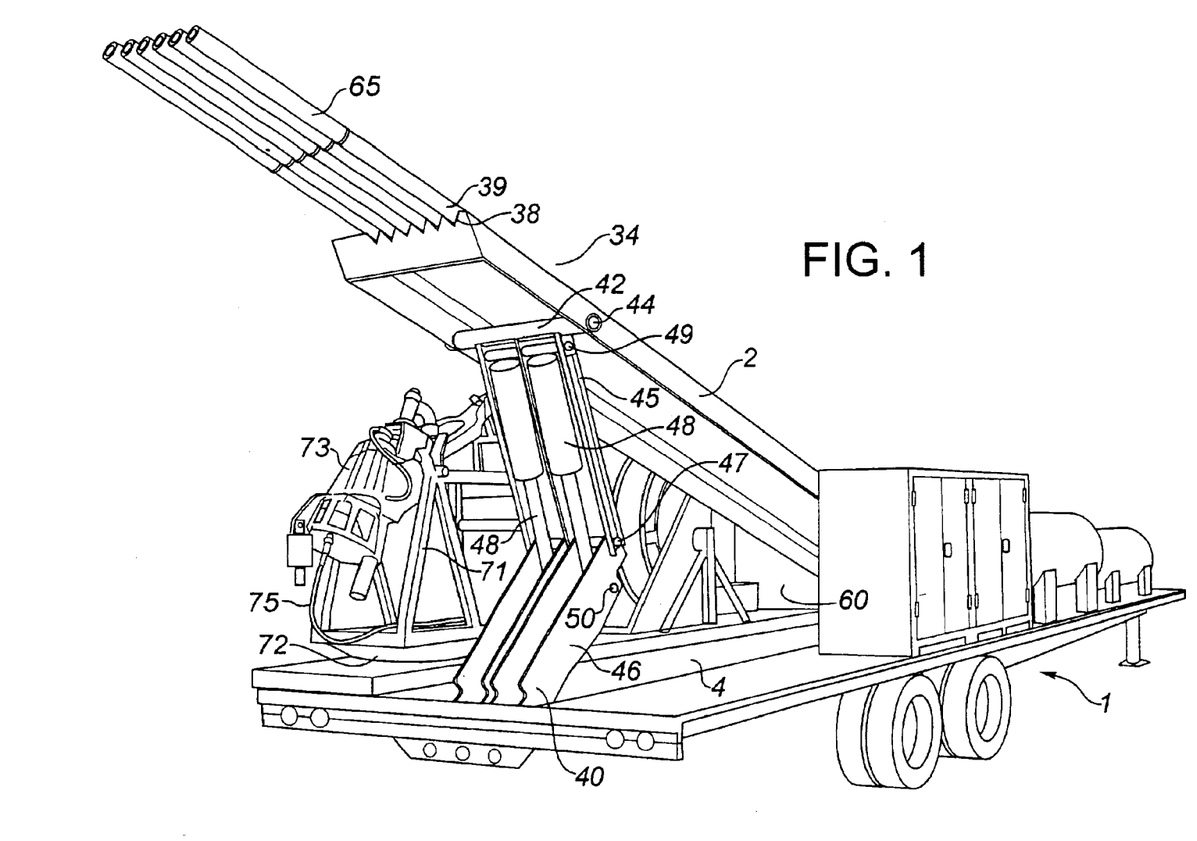
FIG. 1 is a perspective view of the trailer with the bed in the upraised position.

As shown in FIG. 1, a trailer 1 is provided to support and convey a bed 2. The trailer 1 has a U-shaped frame 3 forming a central rectangular opening 4 extending lengthwise of the frame 3 from its rear end. The frame 3 comprises a pair of parallel I-beams 5 extending along the side edges of the opening 4. Each I-beam 5 has an inwardly projecting square tubing member 6 welded to its web to provide a track 7. In summary, there is provided a trailer 1 having a frame 3 supporting a pair of parallel tracks 7 extending lengthwise of the frame.

A rectangular carriage 10 is provided to fit in the opening 4 and run on the tracks 7. The carriage 10 has side rails 11 connected by cross rails 12. Roller holders 13 are secured to the cross rails 12. Rollers 14 extend from the holders 13 for running on the tracks 7. The carriage 10 may therefore roll back and forth on the tracks 7.

A double acting hydraulic cylinder 20 is pivotally connected to the frame 3 and the carriage 10 by pins 21 and support members 22 at connection points 23, 24. The cylinder 20 provides means operative to advance and retract the carriage 10 along the tracks 7.

A rectangular bed 2 is pivotally connected adjacent its front end 31 to the front end of the carriage 10 by pivot pins 32 and support members 33. The rear end 34 of the bed 30 is free to be raised. The bed 30 comprises a sub-frame carrying a top wall 36. The top wall 36 is grooved lengthwise to form grooves 37 and corrugations 38 operative to support, restrain and guide drill collars 39 positioned therein.

Figure 8:
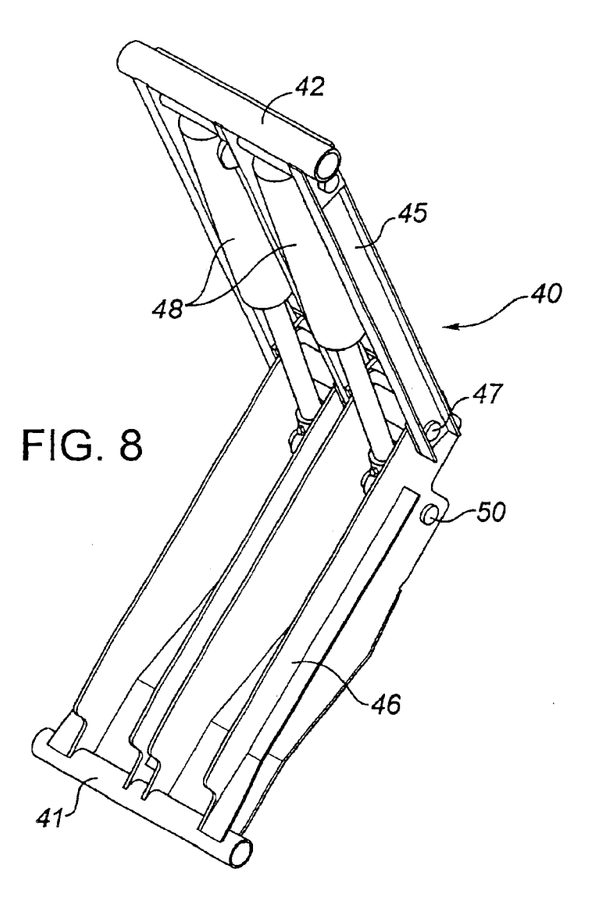
FIG. 8 is a perspective view of the scissor hoist.
Figure 9:
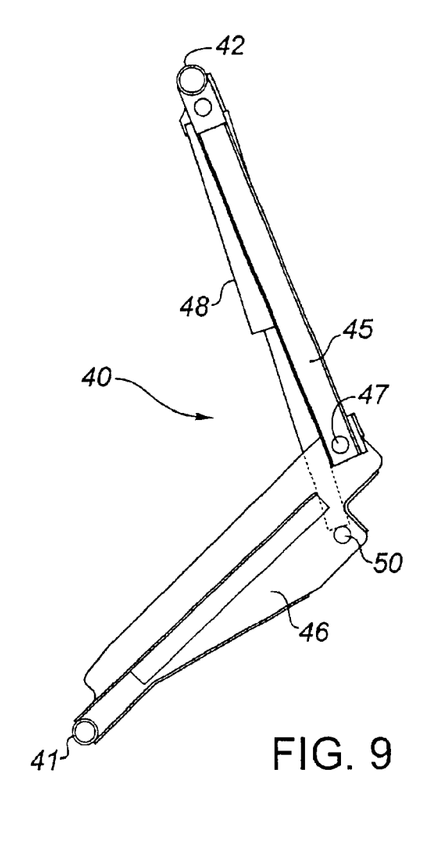
FIG. 9 is a side view of the scissor hoist.
Figure 10:
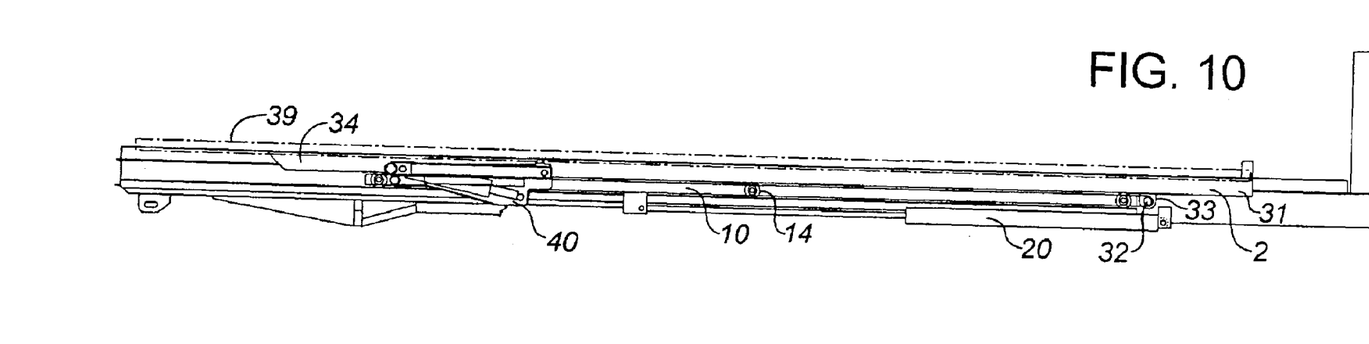
FIG. 10 is a side view of the trailer frame, carriage, carriage cylinder, bed and scissor hoist shown in the flat position.
Figure 11:
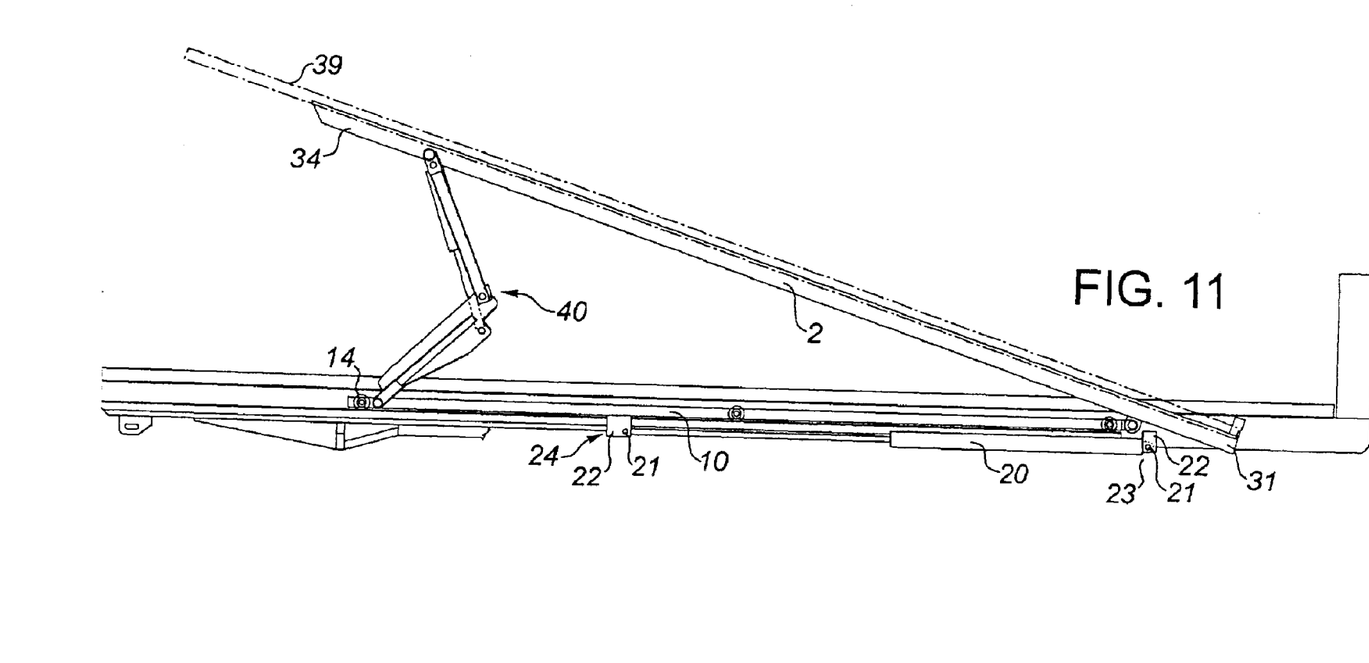
FIG. 11 is a side view similar to FIG. 10, showing the bed raised.
Figure 12:
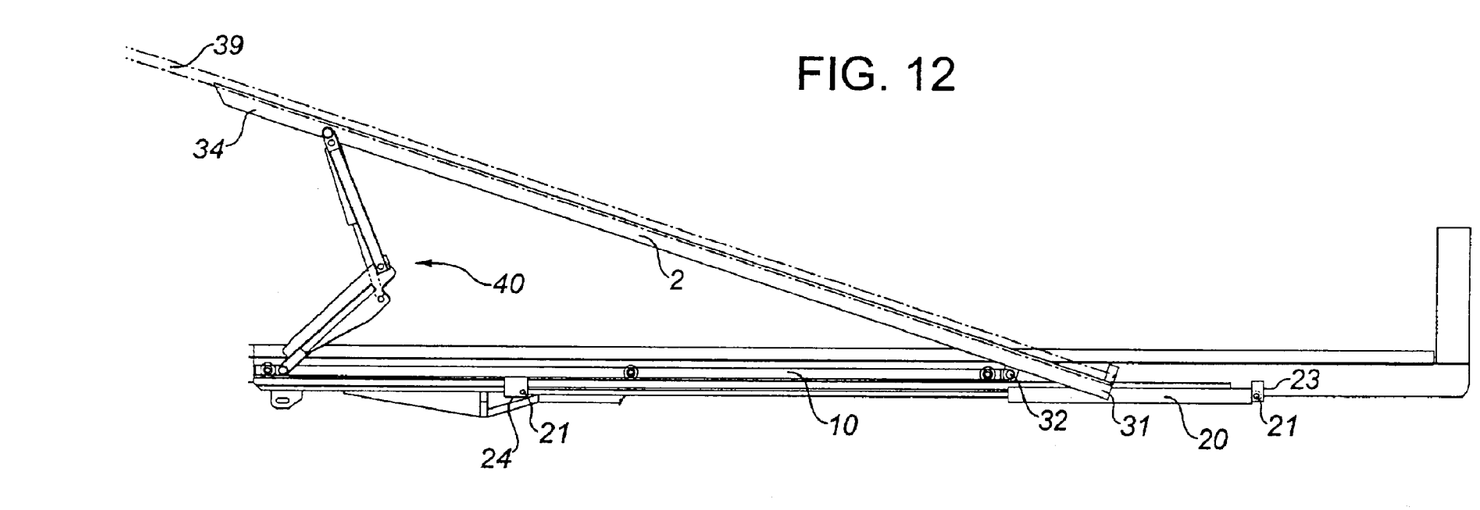
FIG. 12 is a side view similar to FIG. 11, with the bed advanced to the rearmost position.
Figure 13:
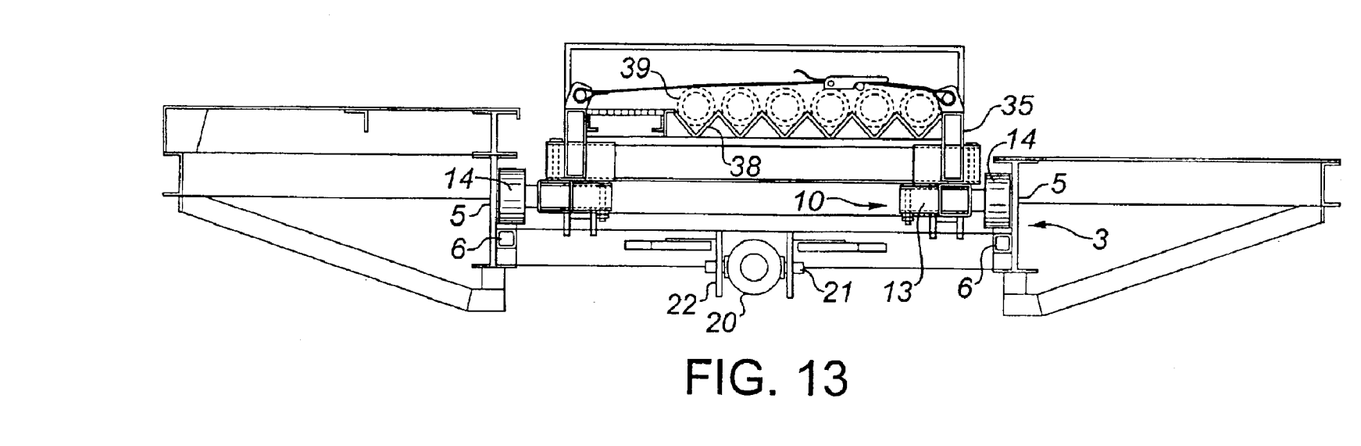
FIG. 13 is an end view of the bed, carriage and trailer frame.
Figure 14:
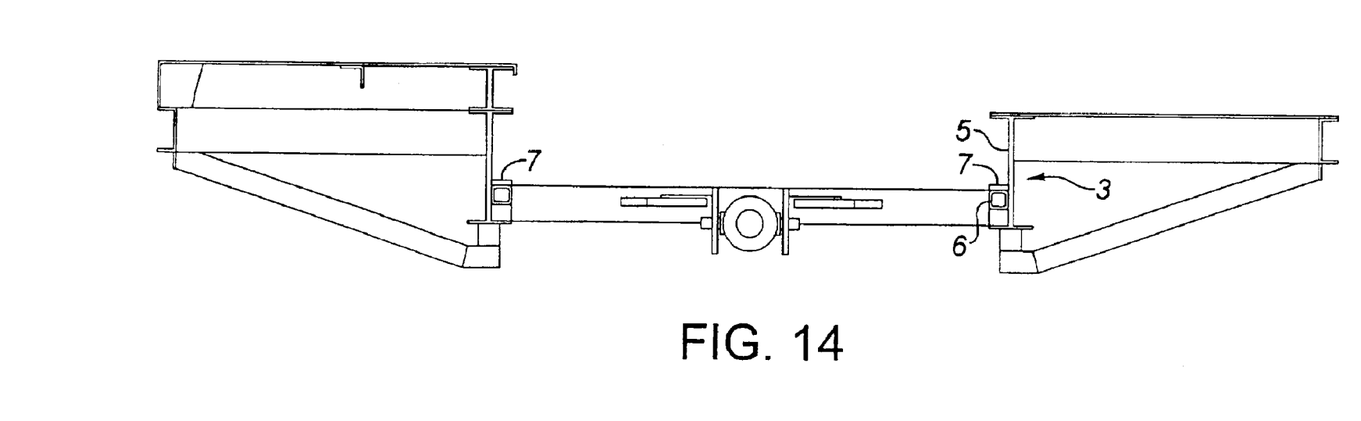
FIG. 14 is an end view of the trailer frame.
Figure 15:
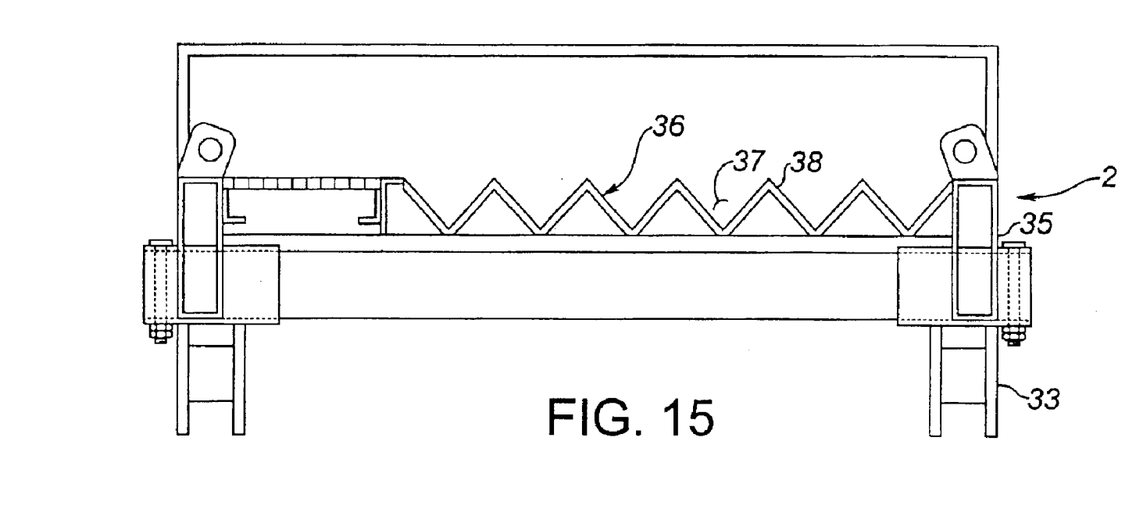
FIG. 15 is an end view of the bed.
Figure 16:
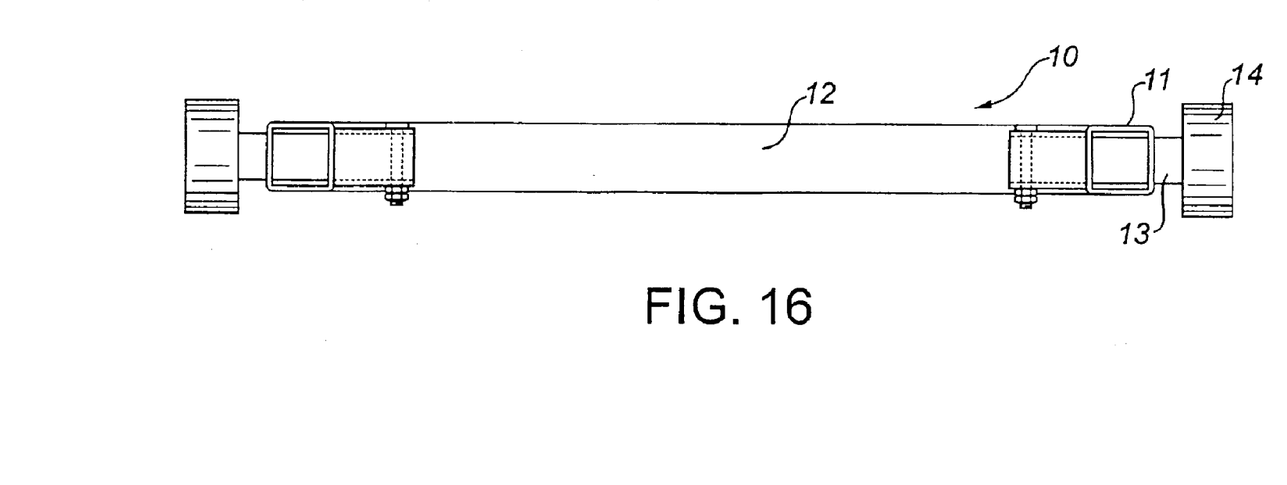
FIG. 16 is an end view of the carriage.

A conventional scissor hoist 40 is pivotally connected by sleeves 41, 42 and cross-rods 43, 44 with the carriage 10 and rear end of the bed sub-frame 35. The hoist 40 comprises frames 45, 46 hinged together by pin 47. Hydraulic cylinders 48 are pivotally connected to the frames 45, 46 by pins 49, 50 and function to unfold the hoist the raise the rear end of the bed 30. Broadly stated, the scissor hoist 40 provides means, connected between the carriage 10 and bed 2, for raising the rear end 34 of the bed.

A hydraulic motor assembly 60 is provided on the trailer 1 for actuating cylinders 20, 48 as required through suitable hoses (not shown) as well as the top drive 73 through hose 75.

Figure 2:
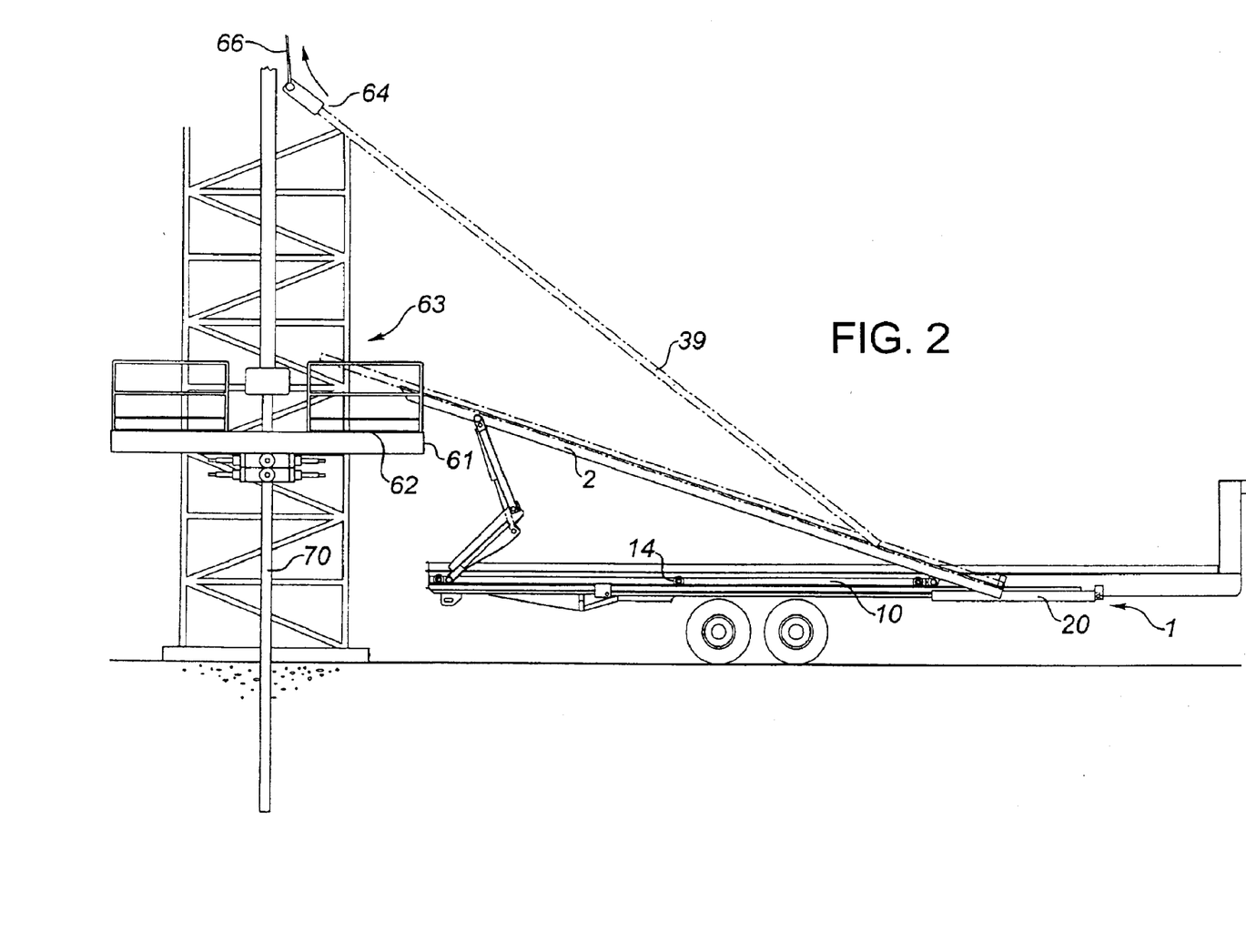
FIG. 2 is a side view of the trailer, with parts removed, showing the bed in the rearmost position and upraised over the rig floor, with a drill collar being lifted.
Figures 3, 4:
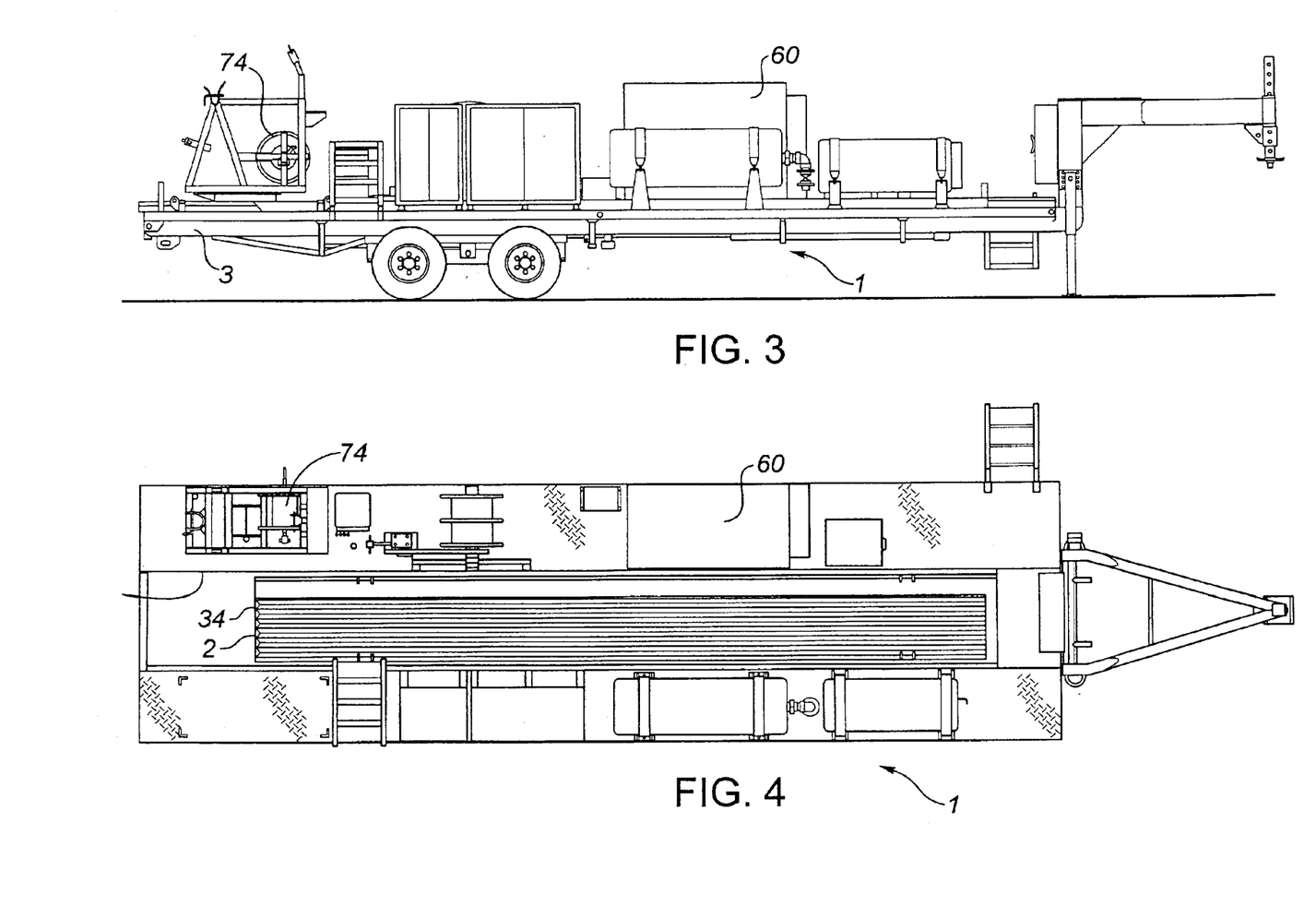
FIG. 3 is a side elevation of the trailer.
FIG. 4 is a plan view of the trailer.
Figure 5:
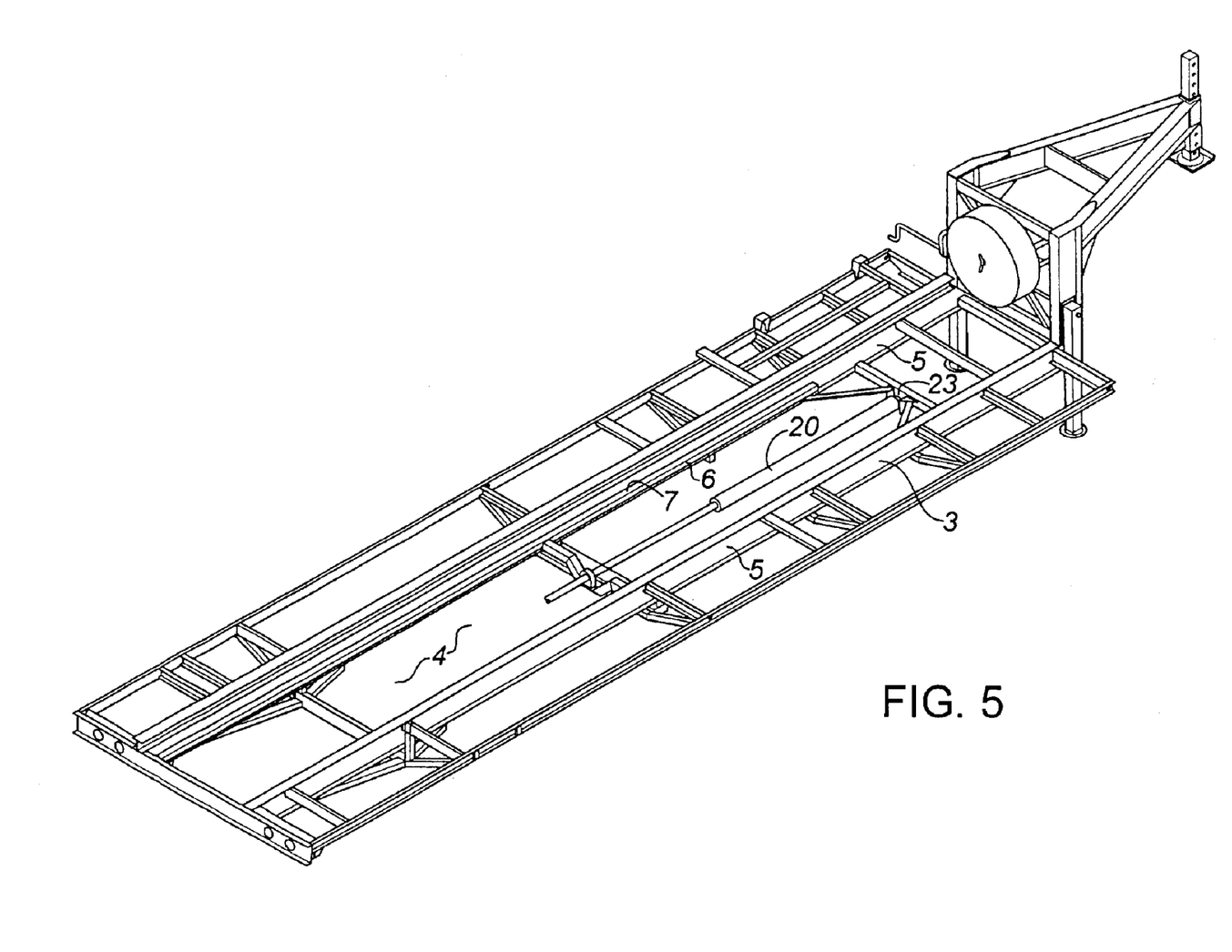
FIG. 5 is a perspective view of the trailer frame.
Figure 6:
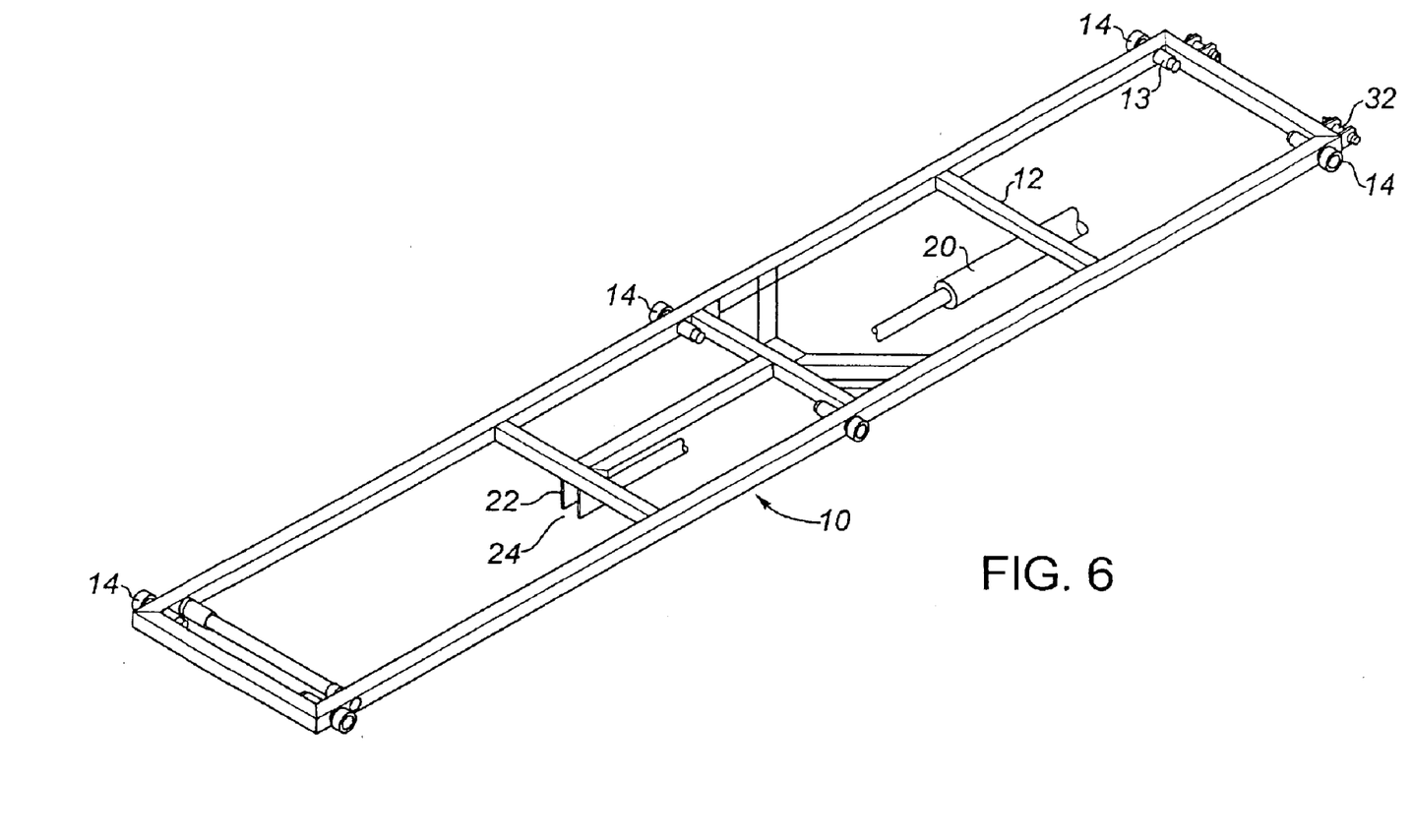
FIG. 6 is a perspective view of the carriage.
Figure 7:
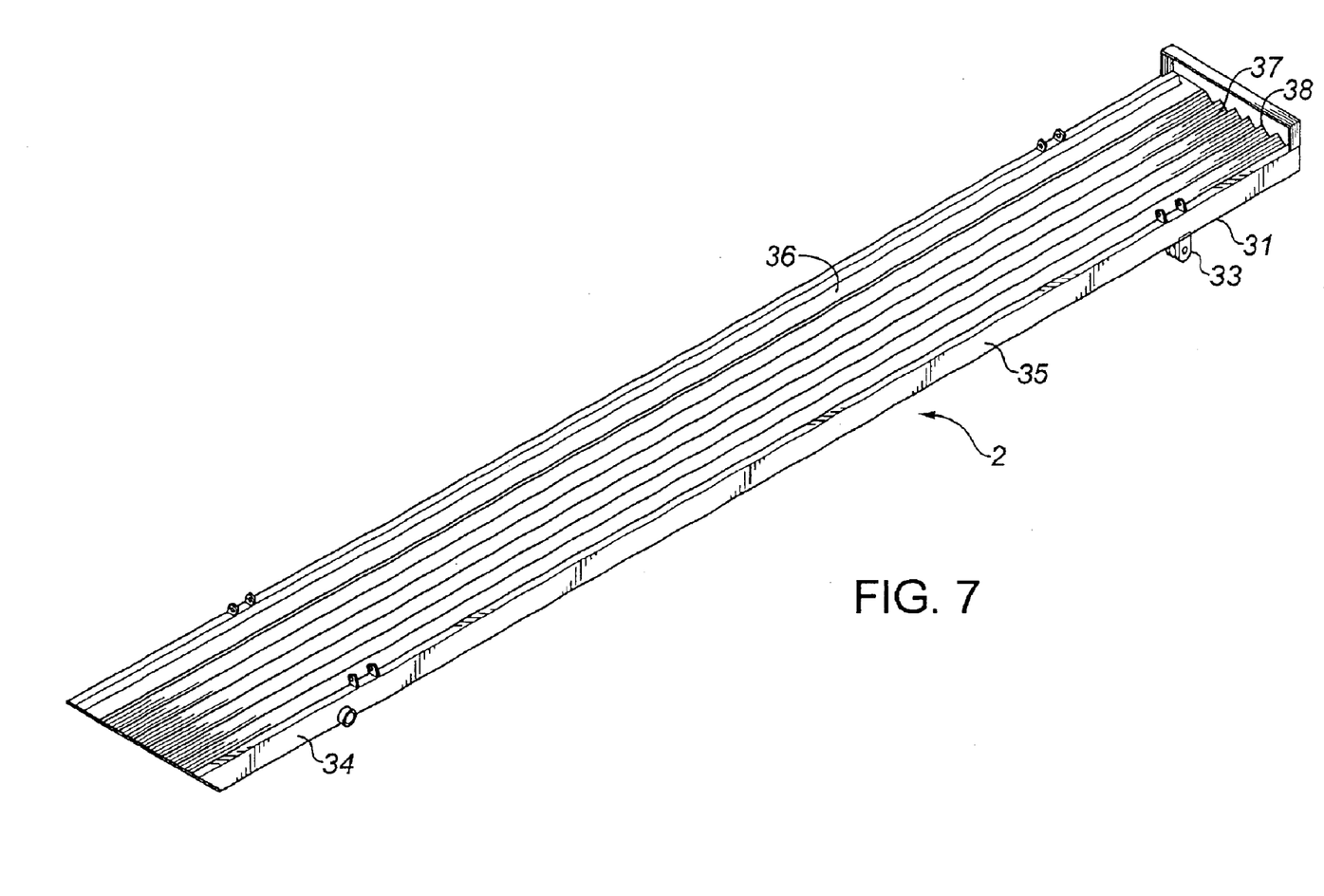
FIG. 7 is a perspective view of the bed.

From the foregoing it will be understood that the bed 2 of a trailer 1 can be loaded at a storage site with drill collars 39 and trucked to a well site. The rear end of the trailer 1 can be backed to within several feet of the well 70 and close to the edge 61 of the floor 62 of a service rig 63. The scissor hoist 40 can then be actuated to raise the rear end 34 of the bed 2 above the level of the rig floor. The cylinder 20 can then be actuated to advance the carriage 10 and inclined bed 2 rearwardly until the drill collars 39 are positioned within reach of the rig elevators 64. Pick-up subs 65 are threaded into the raised ends of the drill collars. The elevators 64 are then latched onto one of the pick-up subs 65 and the rig hoisting assembly 66 is used to drag the attached collar 39 to an upright position above the floor 62. The groove corrugations 38 function to guide the lower end of the drill collar 39 as it is pulled along the bed 2.

In a preferred feature, a cradle 71 is mounted on a rotatable turntable 72 supported by the trailer frame 3, for supporting a top drive 73. The cradle 71 can be turned to align the top drive 73 with a lifting winch cable from the rig, thereby making it easier to lift the top drive out of the cradle. A winch 74 is provided on the trailer i in front of the turntable 72. The cable of the winch 74 can be used to restrain and control the top drive 73 as the rig winch cable pulls it and raises it to the rig. Alternatively, the cable of the winch 74 can be used to pull the top drive 73 toward the cradle 71 when the rig hoisting cable is carrying the top drive to return it to the trailer.

The embodiments of the invention in which an exclusive property or privilege is claimed are defined as follows:

1. Apparatus for positioning oilfield drill collars at the floor of a service rig having elevators and located over a wellhead at a well site, comprising:

a wheeled vehicle having a horizontal frame supporting a pair of parallel, laterally spaced-apart tracks extending lengthwise of the frame, the vehicle having front and rear ends;

a horizontal carriage having front and rear rollers supported by the tracks, said carriage being operative to roll along the tracks;

means, connected between the frame and the carriage, for advancing and retracting the carriage along the tracks;

a flat bed carried by the carriage means for pivotally connecting and securing the front end of the bed with the front end of the carriage, whereby the front end of the bed is hinged to the front end of the carriage and the rear end of the bed is free to be raised;

means, connected between the carriage and the bed, for raising the rear end of the bed;

the bed having means, on its upper surface, for supporting, retaining and guiding a plurality of drill collars.

2. The apparatus as set forth in claim 1 wherein:

the upper surface of the bed forms parallel grooves and corrugations, extending longitudinally of the bed for retaining and guiding tubulars seated therein.

3. The apparatus as set forth in claim 2 wherein:

the means for advancing and retracting the carriage comprises a first hydraulic cylinder;

the means for supporting and raising the rear end of the bed comprises a hydraulic cylinder scissors hoist; and the apparatus further comprises:

a cradle carried by the frame and rotatably mounted for rotation about a vertical axis;

a top drive carried by the cradle; and a hydraulic motor assembly, carried by the frame, for actuating the first hydraulic cylinder, the hydraulic cylinder scissor hoist and the top drive.

4. Apparatus for supplying a service rig with drilling components, comprising:

a wheeled trailer having a horizontal frame supporting track means extending lengthwise of the frame, the vehicle having front and rear ends;

a carriage, having front and rear rollers supported by the track means, operative to roll along the track means;

hydraulic cylinder means, connected between the frame and the carriage, for advancing and retracting the carriage along the track means;

a flat bed carried by the carriage;

means for pivotally connecting and securing the front end of the bed with the front end of the carriage, so that the front end of the bed is hinged to the carriage and the rear end of the bed is free to be raised;

a hydraulic cylinder scissor hoist, pivotally connected between the carriage and the bed, for raising the rear end of the bed;

the bed having means forming lengthwise grooves and corrugations on its upper surface for supporting, retaining and guiding a plurality of drill collars;

a rotatable cradle carried by the frame;

a top drive carried by the cradle; and a hydraulic motor assembly, carried by the frame, for actuating the hydraulic cylinder means, the hydraulic cylinder scissor hoist and the top drive.

5. The apparatus of claim 4, wherein said frame is U-shaped.

\* \* \* \* \*